UNITED STATES PATENT OFFICE.

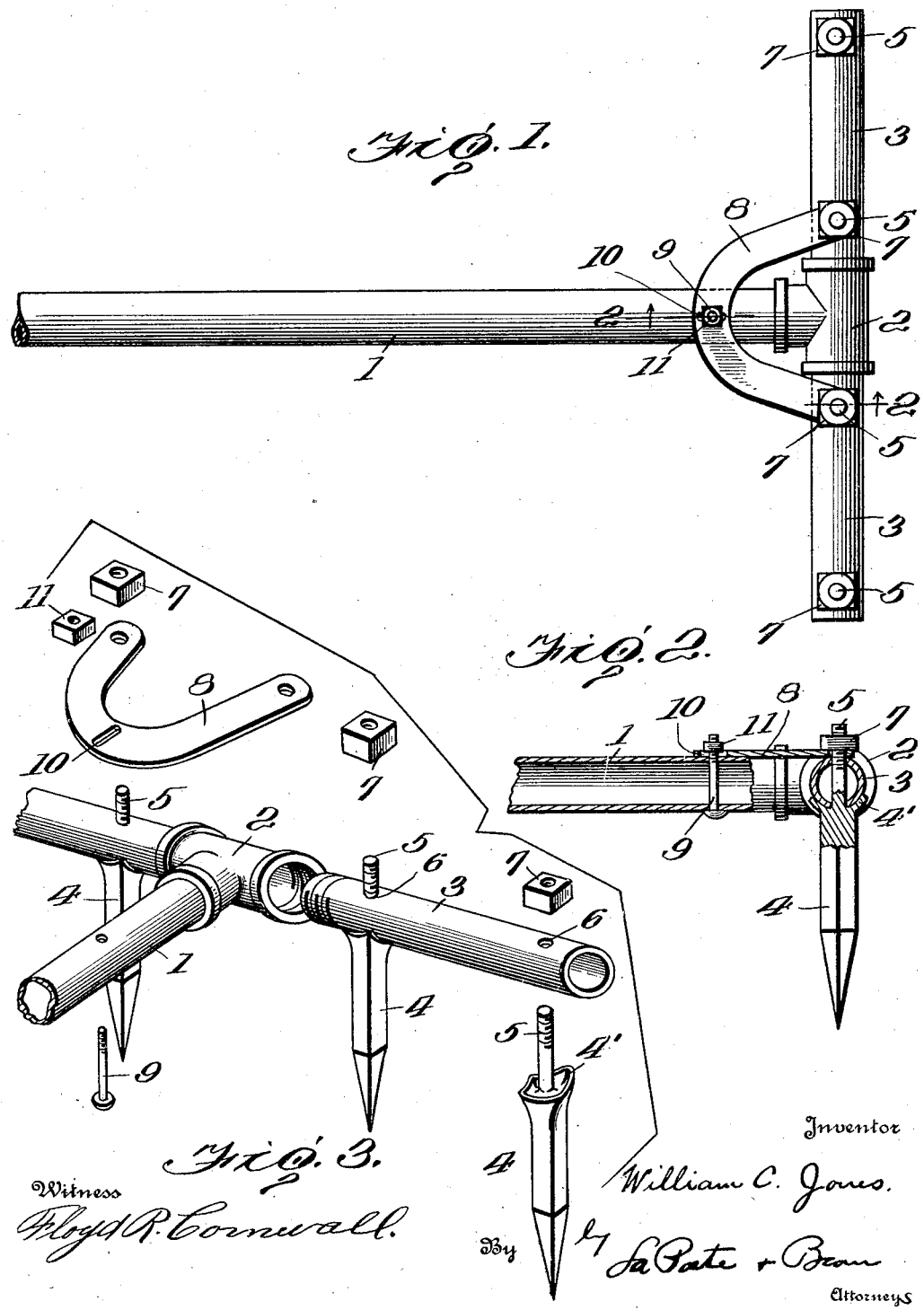

WILLIAM C. JONES, OF NIANTIC, ILLINOIS.

RAKE.

1,318,765. Specification of Letters Patent. Patented Oct. 14, 1919.

Application filed January 26, 1918. Serial No. 213,953.

*To all whom it may concern:*

Be it known that I, WILLIAM C. JONES, a citizen of the United States, a resident of Niantic, in the county of Macon and State of Illinois, have invented new and useful Improvements in Rakes, of which the following is a specification.

My invention relates to improvements in rakes, and more particularly to rakes for working in ear corn or cobs in cribs and similar structures, though it is to be understood that there are various uses for an implement of this construction.

The principal object of this invention is the provision of such an implement which is of sufficient weight to work properly in material of the kind specified, and in which the teeth or tines may be adjusted at various angles to the head of the device.

Further objects include improvements in details of construction and arrangement, whereby a simple and effective device is provided for the specified purposes, and it is to be understood that various changes may be made in practice within the scope of the claim without digressing from my inventive idea.

In the drawing—

Figure 1 represents a top plan view of an implement constructed so as to embody my invention.

Fig. 2 represents a vertical section taken substantially on line 2—2 of Fig. 1.

Fig. 3 represents a view of the various parts before being assembled.

Referring now to the drawing, the numeral 1 designates the handle of the device which may be of any suitable length and is preferably in the form of a tube or pipe, as shown. On the end thereof is secured the T-coupling 2, into the ends of which are screwed the two laterally extending members 3, which are preferably short tubes or pipes, as shown, and which form the head of the implement.

The fingers, teeth or tines 4 are formed with the seat 4' and have the screw threaded stud 5 extending upwardly therefrom to pass through the aperture 6 in the head members 3, the seat 4' fitting the under side of the head members, as shown. Nuts 7 form the securing means to complete the assembly of the fingers, teeth or tines in the head members.

In order to brace the connection between the handle and the head, I provide the U-shaped member 8 the ends of which are apertured to permit the passage of the studs 5 therethrough the nuts 7 forming the securing means. The brace member is secured to the handle by means of the bolt 9 which passes through the handle and the slot 10 in the curved part of the brace member, the nut 11 forming the securing means.

It is to be noted that the brace member securely connects the handle and the head of the implement, and is secured to the head by the same means that secures the inner fingers, teeth or tines thereto. Also by the provision of the slot 10, the angular position of the fingers, teeth or tines relative to the handle may be varied, as the members 3 may be turned in the T-coupling, and then the parts fastened at the desired adjustment, as is obvious.

It is seen, therefore, that I have provided an implement of the character described which is of simple and strong construction and which is of sufficient weight to properly handle comparatively bulky materials, such as ear corn, cobs, and the like.

What I claim is:—

A device of the character described, including in combination, a handle, a T-coupling secured thereto, a head member secured to each end of the T-coupling, fingers having securing studs passing through the head members, and a brace member connecting the handle and the head members and having its ends secured to the head members by said securing studs, the connection of the brace member to the handle being adjustable to permit the rotary adjustment of the head members relative to the handle to vary the inclination of the fingers.

In witness whereof, I have hereunto affixed my hand this 17th day of January, 1918.

WILLIAM C. JONES.

Copies of this patent may be obtained for five cents each, by addressing the "Commissioner of Patents, Washington, D. C."